US008745183B2

(12) United States Patent
Olston

(10) Patent No.: US 8,745,183 B2
(45) Date of Patent: *Jun. 3, 2014

(54) SYSTEM AND METHOD FOR ADAPTIVELY REFRESHING A WEB PAGE

(75) Inventor: Christopher Olston, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1525 days.

This patent is subject to a terminal disclaimer.

(21) Appl. No.: 11/588,020

(22) Filed: Oct. 26, 2006

(65) Prior Publication Data

US 2008/0104256 A1 May 1, 2008

(51) Int. Cl.
*G06F 15/173* (2006.01)
*G06F 7/00* (2006.01)
*G06F 17/00* (2006.01)
*G06F 17/30* (2006.01)

(52) U.S. Cl.
USPC ........... 709/223; 707/709; 707/711; 707/695; 707/696

(58) Field of Classification Search
USPC .......... 709/228–229, 223; 707/3–7, 695, 696, 707/709, 711
See application file for complete search history.

(56) References Cited

U.S. PATENT DOCUMENTS

| 5,442,780 | A | 8/1995 | Takanashi |
| 5,544,049 | A | 8/1996 | Henderson |
| 5,577,249 | A | 11/1996 | Califano |
| 5,778,363 | A | 7/1998 | Light |
| 5,906,677 | A | 5/1999 | Dudley |
| 5,907,837 | A | 5/1999 | Ferrel |
| 5,974,455 | A | 10/1999 | Monier |
| 6,145,003 | A | 11/2000 | Sanu |
| 6,157,963 | A | 12/2000 | Courtright, II |
| 6,182,085 | B1 | 1/2001 | Eichstaedt |
| 6,192,364 | B1 | 2/2001 | Baclawski |
| 6,230,155 | B1 | 5/2001 | Broder |
| 6,263,364 | B1 | 7/2001 | Najork |
| 6,401,118 | B1 | 6/2002 | Thomas |
| 6,615,209 | B1 | 9/2003 | Gomes |
| 7,346,839 | B2 * | 3/2008 | Acharya et al. ...................... 1/1 |
| 7,412,708 | B1 * | 8/2008 | Khan et al. .................... 719/318 |

(Continued)

OTHER PUBLICATIONS

Pandey, S. and Olston, C. 2005. User-centric Web crawling. In Proceedings of the 14th international Conference on World Wide Web (Chiba, Japan, May 10-14, 2005). WWW '05. ACM, New York, NY, 401-411. DOI= doi.acm.org/10.1145/1060745.1060805.*

(Continued)

*Primary Examiner* — Nicholas Jensen
(74) *Attorney, Agent, or Firm* — Michael J. Buchenhorner

(57) ABSTRACT

An improved system and method is provided for adaptively refreshing a web page. A base version of the web page may be partitioned into a collection of fragments. Then the collection of fragments may be compared with the corresponding fragments of a recent version of the web page to determine a divergence measurement of the difference between the base version and the recent version of the web page. The divergence measurement may be recorded in a change profile representing a change history of the web page that includes a sequence of numeric pairs indicating a time offset and a divergence measurement of the difference between a version of the web page at the time offset and a base version of the web page. The refresh period for the web page may be adjusted by applying an adaptive refresh policy using the divergence measurements recorded in the change profile.

7 Claims, 7 Drawing Sheets

(56) References Cited

U.S. PATENT DOCUMENTS

| | | | | |
|---|---|---|---|---|
| 7,725,452 | B1* | 5/2010 | Randall | 707/709 |
| 7,797,316 | B2* | 9/2010 | Henzinger | 707/728 |
| 2004/0225644 | A1* | 11/2004 | Squillante et al. | 707/3 |
| 2005/0192936 | A1* | 9/2005 | Meek et al. | 707/3 |
| 2005/0278322 | A1 | 12/2005 | Fan | |
| 2006/0224577 | A1* | 10/2006 | Hullender et al. | 707/5 |
| 2007/0239701 | A1* | 10/2007 | Blackman et al. | 707/5 |

OTHER PUBLICATIONS

Cho and H. Garcia-Molina. Estimating frequency of change. ACM Transactions on Internet Technology(TOIT), 3:256-290, 2000.*

Panagiotis G. Ipeirotis, Alexandros Ntoulas, Junghoo Cho, Luis Gravano, "Modeling and Managing Content Changes in Text Databases," icde, pp. 606-617, 21st International Conference on Data Engineering (ICDE'05), 2005, http://qprober.cs.columbia.edu/publications/icde2005.pdf.*

Bertino, E., et al., "A matching algorithm for measuring the structural similarity between an XM1V document and a DTD and its applications," *Information Systems*, 29, 23-46, Mar. 2004.

Bosc, P. et al., "On the comparison of imprecise values in fuzzy databases," *IEEE*, vol. 2, 707-712, Jul. 1997.

Brin, S. et al., "Copy Detection Mechanisms for Digital Documents," Department of Computer Science, Stanford University, 1995.

Broder, A, "On the resemblance and containment of documents," *Compression and complexity of sequences, Proceedings*, Jun. 1997.

Broder, A. et al., "Syntactic Clustering of the Web," *Proceedings World Wide Web*, Jul. 1997.

Broder, A. "Some applications of Rabin's fingerprinting method," *Sequences II: Methods in Communications, Security and Computer Science*, 1-10, 1993.

Chen, Yi-Long et al., "Image correspondence based on region Hierarchy," Conference Proceedings, *International Conference on Circuits and Systems*, Jun. 1991.

Cho, Junghoo et al., "Synchronizing a Database to Improve Freshness," *Proceeding of ACM SIGMOD*, 2000.

Coffman, E. et al., Optimal Robot Scheduling for Web Search Engines, *Journal of Scheduling*, 1, 1998.

Cubero, J.C. et al., "Weak and Strong resemblance in fuzzy functional dependencies," *IEEE World Congress on computational intelligence*, 1, 162-166, Jun. 1994.

Dhyani, D., et al., "A survey of Web metrics," *ACM Computing Surveys*, 34(4) 469-503, 2002.

Edwards, J. et al., "An Adaptive Model for Optimizing Performance of an Incremental Web Crawler," *Proceeding of the World Wide Web 10*, 106-113, May 2001.

Garćia-Solaco, M. et al., "Discovering Interdatabase resemblance of classes for interperable databases," *Research Issues in Data Engineering*, Apr. 1993.

Office Action for U.S. Appl. No. 11/588,022, Jun. 24, 2009.
Office Action for U.S. Appl. No. 11/588,019, Jan. 13, 2010.
Office Action for U.S. Appl. No. 11/588,019, Jun. 23, 2009.

Page, L. et al., The Page Rank Citation Ranking. Bringing Order to the Web, Technical Report, Stanford University, Jan. 1998.

Wolf, J. L., et al., "Optimal crawling strategies for web search engines," *Proceedings of the 11th international Conference on World Wide Web*, May 2002.

"The Document Object Model," www.w3.org/DOM/, Jan. 2005.

* cited by examiner

SYSTEM AND METHOD FOR ADAPTIVELY REFRESHING A WEB PAGE

CROSS-REFERENCE TO RELATED APPLICATIONS

The present invention is related to the following United States patent application, filed concurrently herewith and incorporated herein in its entirety:

"System and Method for Providing a Change Profile of a Web Page," application Ser. No. 11/588,019, now abandoned; and "System and Method Using a Refresh Policy for Incremental Updating of Web Pages," application Ser. No. 11/588,022, now abandoned.

The present invention is also related to the following commonly-owned U.S. patents:

U.S. Pat. No. 6,230,155, entitled "Method for Determining the Resemblance of Documents"; and U.S. Pat. No. 6,263,364, entitled "Web Crawler System Using Plurality of Parallel Priority Level Queues Having Distinct Associated Download Priority Levels for Prioritizing Document Downloading and Maintaining Document Freshness".

FIELD OF THE INVENTION

The invention relates generally to computer systems, and more particularly to an improved system and method for adaptively refreshing a web page.

BACKGROUND OF THE INVENTION

Refreshing web pages is a common procedure performed by web crawlers for updating content indexed for use by search engines responding to search queries. Modern search engines may typically rely on incremental web crawlers to feed content into various indexing and analysis layers, which in turn may provide content to a ranking layer that handles user search queries. In general, the crawling layer of a web crawler may download new web pages and refresh web pages that have changing content. Refreshing web pages very frequently may keep content of the web pages updated, but may place an unacceptable burden on the web crawler and may leave few resources available for discovering and downloading new web pages with content not yet indexed.

Although functional, existing refreshing techniques may not be able to efficiently ensure adequate freshness of indexed web page content. First of all, current web page refresh techniques may fail to be selective and may not target important and persistent information. Web pages may be unnecessarily refreshed with unimportant and ephemeral content. Without focusing on important and long-lasting content, web pages with unimportant and ephemeral content such as advertisements or the "quote of the day" may be refreshed for indexing, resulting in a waste of web crawler resources. Second, current web page refresh techniques may fail to be adaptive and may not react to shifting web page change behavior. Refresh techniques may assume static web page change behavior that may result in under-refreshing or over-refreshing a web page over time. Third, current web page refresh techniques may employ global coordination to schedule resources for refreshing web pages and fail to ensure scalability with minimal overhead. Modern web crawlers may apply a high degree of parallel processing by deploying hundreds or thousands of nodes and such global coordination for resource allocation and/or scheduling may be inefficient.

The web page refreshing problem has been studied in the past, starting with simple page change models (e.g., Poisson update process), objective functions (e.g., binary freshness), and adaptivity. See for example, J. Cho and H. Garcia-Molina, *Synchronizing a Database to Improve Freshness*, In Proceeding of ACM SIGMOD, 2000; E. Coffman, Z. Liu, and R. R. Weber, *Optimal Robot Scheduling for Web Search Engines*, Journal of Scheduling, 1, 1998; and J. Edwards, K. S. McCurley, and J. A. Tomlin, *An Adaptive Model for Optimizing Performance of an Incremental Web Crawler*, In Proceeding of the World Wide Web, 2001. Others have studied time-dependent change models and objective functions that take into account search result ranking. See for example S. Pandey and C. Olston, *User-centric Web Crawling*. In Proceeding of the World Wide Web, 2005; and J. Wolf, M. Squillante, P. S. Yu, J. Sethuraman, and L. Ozsen, *Optimal Crawling Strategies for Web Search Engines*, In Proceeding of the World Wide Web, 2002. Unfortunately, each of these prior models fails to take into account longevity of information, and almost all prior work formulates a global optimization problem and proposes a solution based on some kind of offline optimization procedure.

What is needed is a way to adaptively refreshing a web page. Such a system and method should be able to apply a web page refresh strategy that may be selective, adaptive and local with minimal cross-node communication among processing nodes executing web page refresh scheduling in a distributed system.

SUMMARY OF THE INVENTION

Briefly, the present invention may provide a system and method for adaptively refreshing a web page. In an embodiment, a web crawler may be provided for adaptively refreshing a web page for updating content indexed for use by a search engine. The web crawler may include an operably coupled web page fragmentor for partitioning a web page into a collection of fragments, a fragment comparator for determining a divergence measurement for the web page by comparing the collections of fragments of versions of the web page, a page refresh policy manager for implementing a page refresh policy to determine the refresh period for a web page using the divergence measurement, a page refresh scheduler for scheduling refreshing the web page at a time indicated by the refresh period. The web crawler may also include an operably coupled change profile manager for updating a change profile, including the divergence measurement of the web page.

The present invention may adaptively refresh a web page by first partitioning a base version of a web page into a collection of fragments. Then the collection of fragments may be compared with the corresponding fragments of a subsequent version of the web page to determine a divergence measurement of the difference between the base version and the subsequent version of the web page. The refresh period for the web page may be adjusted by applying an adaptive refresh policy using the divergence measurement and a time may be scheduled for refreshing the web page using the adjusted refresh period. The divergence measurement may also be recorded in a change profile for the web page.

The present invention may also provide a system and method of providing a change history of a web page. A change profile may be provided that represents a change history of a web page. The change profile may include a summary of the collection of fragments of a base version of the web page, an initial numeric pair indicating the time when the change profile may be created and a base measurement of a base version of the web page, and a sequence of numeric pairs indicating a time offset and a divergence measurement of the difference between versions of the web page at the time offset and the base version of the web page. Once a web page profile may be created for a web page, the web page profile may be updated when a web page may be refreshed.

In various embodiments, a web page may be adaptively refreshed using a change profile. For instance, when a web page may be refreshed, a subsequent version of the web page may be partitioned into a collection of fragments and the collection of fragments may be compared with the corresponding fragments of a base version of the web page stored in the change profile in order to determine a divergence measurement of the difference between the subsequent version and the base version of the web page. The refresh period for the web page may be adjusted by applying an adaptive refresh policy using the divergence measurement and a time may be scheduled for refreshing the web page using the adjusted refresh period. The divergence measurement may also be recorded in a change profile for the web page by extending the sequence of numeric pairs indicating a time offset and a divergence measurement.

Any adaptive refresh policy may be applied using the framework of the present invention. For instance, an adaptive refresh policy may adjust the refresh period by examining the change history of the web page and by comparing the utility of refreshing the web page at the expiration of the refresh period to a utility threshold. The framework of the present invention will also support other adaptive refresh policies as desired. Other advantages will become apparent from the following detailed description when taken in conjunction with the drawings, in which:

DETAILED DESCRIPTION

Exemplary Operating Environment

Figure 1:
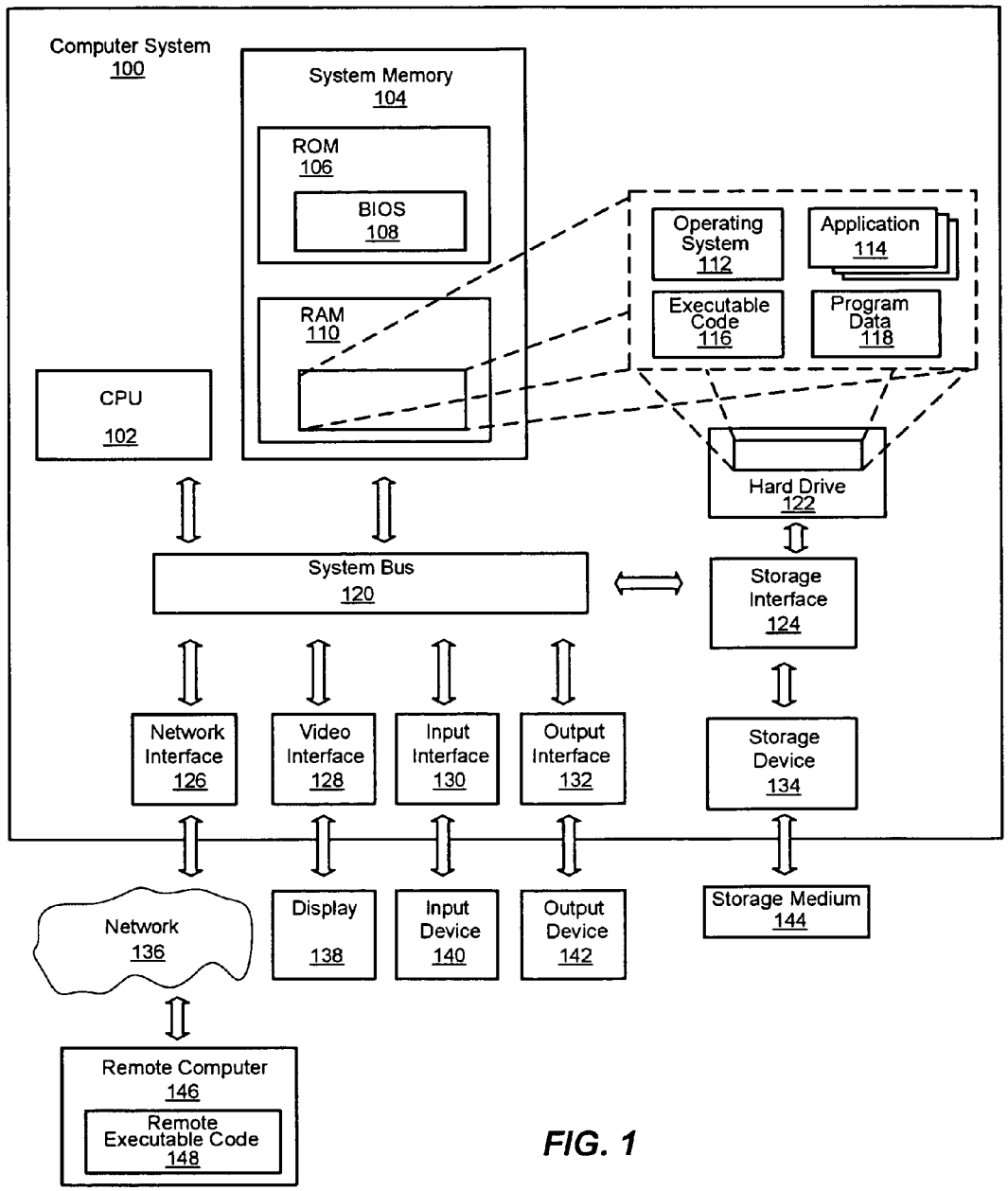
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Adaptively Refreshing a Web Page

The present invention is generally directed towards a system and method for adaptively refreshing a web page. Additionally, a change profile may be provided representing a change history of the web page that may be used to adaptively adjust the refresh period for the web page by applying an adaptive refresh policy using the divergence measurements of the change profile of the web page. Refreshing a web page as used herein may mean retrieving a recent version of a web page, which may be used, for instance, to update an index that may include a previously indexed version of the web page.

As will be seen, a web page may be treated as a collection of fragments, rather than a unit, for the purpose of scheduling refreshing the web page so that a refresh policy may be applied that may be selective, adaptive and local. Advantageously, the web page refresh model presented may be flexibly parameterized by a choice of divergence function to quantify the degree of difference between fresh and outdated versions of a web page. As will be understood, the various block diagrams, flow charts and scenarios described herein are only examples, and there are many other scenarios to which the present invention will apply.

Figure 2:
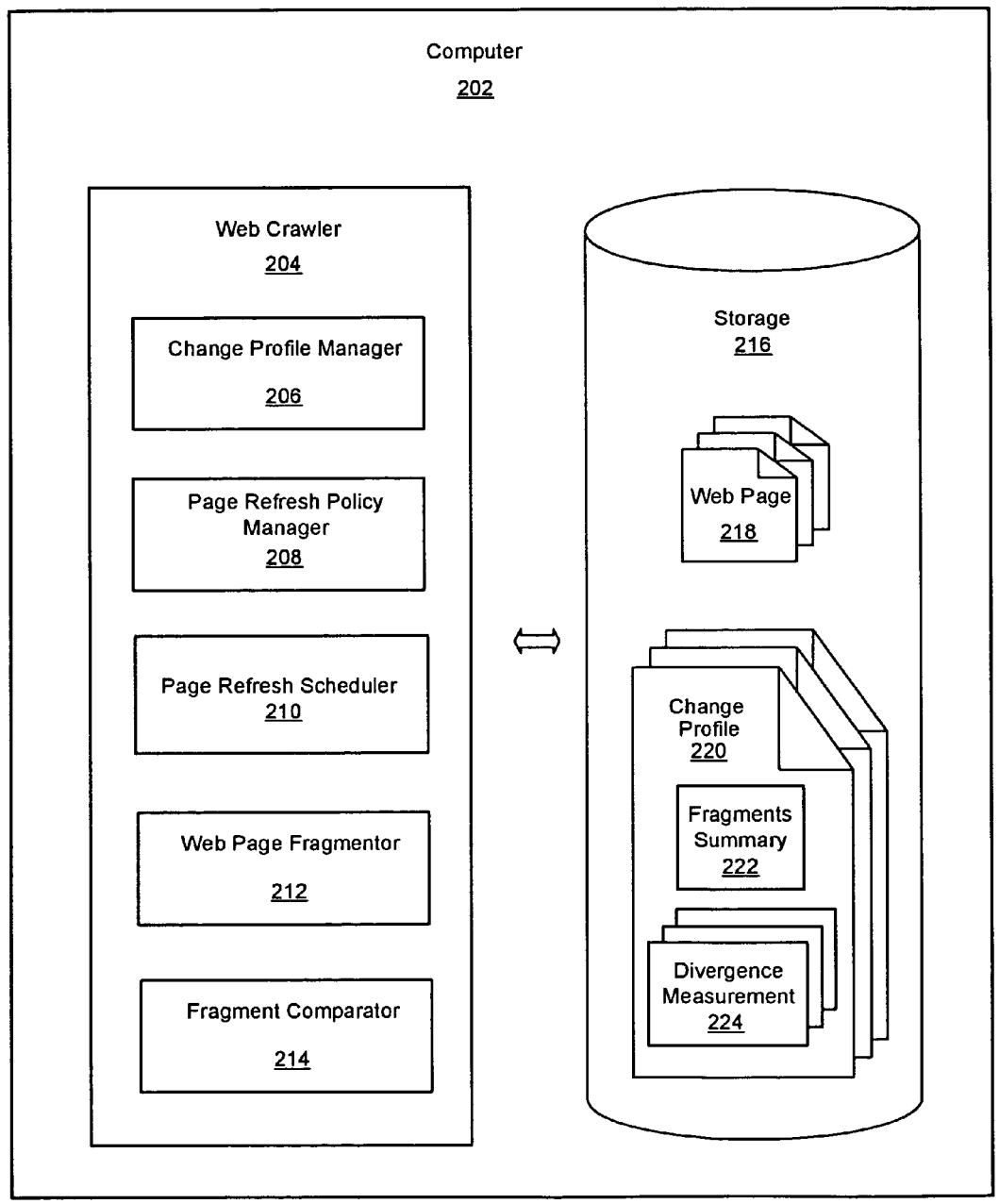
FIG. 2 is a block diagram generally representing an exemplary architecture of system components in an embodiment for adaptively refreshing a web page, in accordance with an aspect of the present invention.

Turning to FIG. 2 of the drawings, there is shown a block diagram generally representing an exemplary architecture of system components for adaptively refreshing a web page. Those skilled in the art will appreciate that the functionality implemented within the blocks illustrated in the diagram may be implemented as separate components or the functionality of several or all of the blocks may be implemented within a single component. For example, the functionality for the web page fragmentor 212 may be included in the same component as the change profile manager 206. Or the functionality of the change profile manager 206 may be implemented as a separate component from the web crawler 204.

In various embodiments, a computer 202, such as computer system 100 of FIG. 1, may include a web crawler 204 operably coupled to storage 216. In general, the web crawler 204 may be any type of executable software code such as a kernel component, an application program, a linked library, an object with methods, and so forth. The storage 216 may be any type of computer-readable media and may store web pages 218, or links to web pages such as URLs, and change profiles 220 of web pages 218. A change profile 220 may include a fragments summary 222 representing a partitioning of a base version of the web page and a sequence of divergence measurements 224 that may represent the numeric degree of difference between a base version of the web page and subsequent versions of the web page.

The web crawler 204 may provide services for refreshing web pages 218 for updating content indexed for use by search engines. A web page may be any information that may be addressable by a URL, including a document, an image, audio, and so forth. The web crawler 204 may include a change profile manager 206 for creating and updating a change profile 220 of a web page 218, a page refresh policy manager 208 for implementing a page refresh policy to determine the refresh period for a web page, a page refresh scheduler 210 for scheduling refreshing a web page at a time indicated by the refresh period, a web page fragmentor 212 for partitioning a web page into a collection of fragments, and a fragment comparator 214 for determining a divergence measurement of the difference between two sets of fragments, each representing different versions of a web page.

Each of these modules may also be any type of executable software code such as a kernel component, an application program, a linked library, an object with methods, or other type of executable software code.

In order to adaptively determine when to refresh web pages in an incremental crawler, ephemeral information (e.g., quote of the day), which may be of little benefit to refresh, may be distinguished from persistent information (e.g., blog entries), which may be worthwhile to refresh. Consider for example two web pages, A and B. Page A may have a small amount of static content and a large amount of highly volatile content that may consist of dynamically generated text and links used to promote other web pages owned by the same organization. Page B may contain a mixture of static content, volatile advertisements, and content changing bi-monthly such as recent recipes of a cooking site. Contrasting pages A and B, the importance of considering the lifetime of information may be appreciated when crafting a page refresh policy. Page A may probably not be worth refreshing often, as most of its updates may simply replace old ephemeral information with new ephemeral information that would have little value for a search engine to try to index. Page B, on the other hand, may be adding information that may persist for one to two months (i.e., recipes) and might be worthwhile to index, making page B worthwhile to refresh frequently.

In general, consider a page P that a web crawler may have downloaded at least once in the past. At a given time t, there may be two versions of P: the source version $P_S(t)$ and the crawled version $P_C(t)$. The divergence, or numeric degree of difference, between the two versions may be defined by a function $D(\bullet)$, such that the divergence between the source and crawled versions of P at time t may be represented by $D(P_S(t), P_C(t))$. The divergence function $D(\bullet)$ may be represented by a variety of forms as long as there may exist a constant $D_{max}$ such that $0 \leq D(\bullet) \leq D_{max}$ for all inputs, and $D(a, a)=0$ for any a, so that, the divergence may be zero for two inputs that may be identical. Thus, immediately after a web crawler may refresh page P, $P_C=P_S$, and there may be no divergence between the two versions. As time moves forward following the refresh, the source version $P_S$ may change while the crawled version $P_C$ may remain fixed, and their divergence may grow from non-zero over time.

Among the variety of forms that may represent the divergence function $D(\bullet)$, a binary function may be chosen, for instance, that may return 0 if the two versions may be identical (or near-identical), and 1 if the two versions may differ. Alternatively, $D(\bullet)$ may be represented by a more complex measure that takes into account the sensitivity of a ranking algorithm to the difference between versions. (See S. Pandey and C. Olston, *User-centric Web Crawling*, in Proceedings of WWW, 2005.) Regardless of the form representing $D(\bullet)$, a collection may be considered fresh if the average page divergence may be low. More specifically, freshness of a collection $\rho$ at time t may be defined as:

$$F(\rho, \tau) = \frac{1}{|\rho|} \sum_{P \in \rho} (D_{max} - D(P_S(t), P_C(t))).$$

Furthermore, the average freshness over time, for some duration of time, $\tau=\{t_1, t_2, \ldots, t_n\}$, may be defined as:

$$F(\rho, \tau) = \frac{1}{|\tau|} \sum_{t \in \tau} F(\rho, t).$$

Suppose that for each page P, divergence may depend only on the time $t_P$ since the last refresh of P. In this model, $D(\bullet)$ may be represented as $D(P_S(t), P_C(t))=f_P(t-t_P)$, for some monotonic function $f_P(\bullet)$. If an objective may be to maximize time-averaged freshness under a fixed resource budget (i.e., X refreshes per second), then it may be shown using La-grange Multipliers that the following policy may be optimal: at each point in time t, pages may be refreshed that may have $U_P(t-t_P) \geq T$, where $U_P(t) = t \cdot f_P(t) - \int_0^t f_P(x)dx$ and T may be a non-negative constant that depends on the resource constraint X, the number of pages, and the $f_P(\bullet)$ functions. $U_P(t)$ may represent the utility of refreshing page P at time t (relative to the last refresh time of P). The constant T may represent a utility threshold and the unit of utility may be divergence×time. Pages may, thus, be refreshed for which the utility of refreshing the page may be at least T.

In order to forecast how a page may behave, it may be useful to assume a web page may continue to behave as it previously did. Hence, a reasonable crawling strategy may be to select a utility threshold $T \geq 0$ representing the amount of utility (in units of divergence×time) for which it may be worthwhile to perform a refresh, and refresh a page whenever its expected utility may exceed T. Resources not spent to keep existing content fresh may be devoted to discovery and crawling of new content. With this approach, the utility threshold T may be a static parameter that may be distributed to crawler nodes and may be adjusted occasionally during global tuning. Once T may be set, refresh scheduling decisions may be local with dependence on T and a given page's change profile. Within this framework a divergence function may be chosen that may determine our freshness model and an estimation of page utility may be made, given that the crawler can only measure divergence at the time of a refresh.

For a binary model of freshness, a binary function may be chosen to represent the divergence function $D(\bullet)$. Given a source version $P_S$ of a web page and a potentially outdated crawled version $P_C$ of the web page held by a web crawler, the crawled version may be considered to be fresh if $P_C$ may be largely the same as $P_S$; otherwise the crawled version may be considered stale. The divergence function may be represented by a binary function defined as:

$$D(P_S, P_C) = \begin{cases} 0 & \text{if } S(P_C, P_S) = \text{True} \\ 1 & \text{otherwise,} \end{cases}$$

where $S(\bullet)$ may be a Boolean function that may test whether $P_C$ and $P_S$ may be similar enough for $P_C$ to be considered fresh. In an embodiment, a choice for $S(\bullet)$ may be a function that returns True, if, and only if, the number of fragments common to both versions may be above a certain threshold. Alternatively $S(\bullet)$ may be defined by the expected disruption to search results due to using $P_C$ instead of $P_S$ in a ranking process. (See, for example, S. Pandey and C. Olston, *User-centric Web Crawling*, in Proceedings of WWW, 2005.)

Such a model may also be extended in another embodiment to provide non-uniform treatment to pages by assigning to each page a numeric importance weight W(P), and replacing the "1" in the above definition by W(P). Importance weights may be based on PageRank scores (see, for example, L. Page, S. Brin, R. Motwani, and T. Winograd, *The PageRank Cita-* tion Ranking: Bringing Order to the Web*, Technical Report, Stanford University, 1998), or the degree of search engine "embarrassment" (see, for example, J. Wolf, M. Squillante, P. S. Yu, J. Sethuraman, and L. Ozsen, Optimal Crawling Strategies for Web Search Engines, in Proceeding of WWW, 2002). Without loss of generality, uniform weighting may be assumed.

While the binary freshness model may provide valuable insights, it may be overly simplistic to use in practice given today's diverse Web environment. Perhaps the most serious shortcoming may be the inability of the binary freshness model to distinguish between persistent and ephemeral information. Consider again the two pages A and B described above. Both pages may change frequently and by a large amount each time. If resources may be precious, then neither page A nor page B ought to be refreshed at any time under the binary freshness model. Such a policy may make sense for page A, because almost all of its content may be replaced with each update, and refreshing frequently may not cause the crawled version to converge to the source version. With page B, on the other hand, each update may create information that may remain on the page for one to two months, so refreshing page B regularly may help the crawled version more closely resemble the source version.

An alternative to a binary freshness model may be to treat a web page as a collection of small fragments, and examine the commonality between the fragments found in the source and crawled versions of a page. Using this approach, a page P may be represented as a set F(P) of unique fragments, and divergence may be defined as a comparison of two sets. In an embodiment, sets may be compared using a symmetric set difference, which may yield the following divergence function:

$$D(P_S, P_C) = |F(P_S) \backslash F(P_C)| + |F(P_C) \backslash F(P_S)|.$$

Importantly, fragment-based freshness may identify that page B may diverge slowly over time, and this characteristic of page B may make it worthwhile to refresh page B despite the fact that it undergoes frequent substantial updates. While the above formulation may identify the characteristic that a web page may diverge slowly over time, it may be problematic in that longer pages may receive preferential treatment for refreshing. A practical alternative to adjust for any preferential treatment in an embodiment may be to normalize each page's divergence to the range [0, 1]. The Jaccard distance may be applied using the following equation to normalize each page's divergence to the range [0, 1]:

$$D(P_S, P_C) = 1 - \frac{|F(P_S) \cap F(P_C)|}{|F(P_S) \cup F(P_C)|}.$$

Additionally, explicit importance weights can be added to give preferential treatment to pages based on criteria of choice as desired. Given the high fixed overhead of refreshing a part of a web page, the act of refreshing a web page may be atomic in various embodiments.

Thus the framework presented may optimally refresh a web page by taking into account longevity of information and may provides a practical refresh scheduling policy that may be adaptive (i.e., adjusts to changing page behavior) and local (i.e., does not require global optimization). These properties may make the refresh scheduling policy suitable for use in a real, parallel Web crawler.

Figure 3:
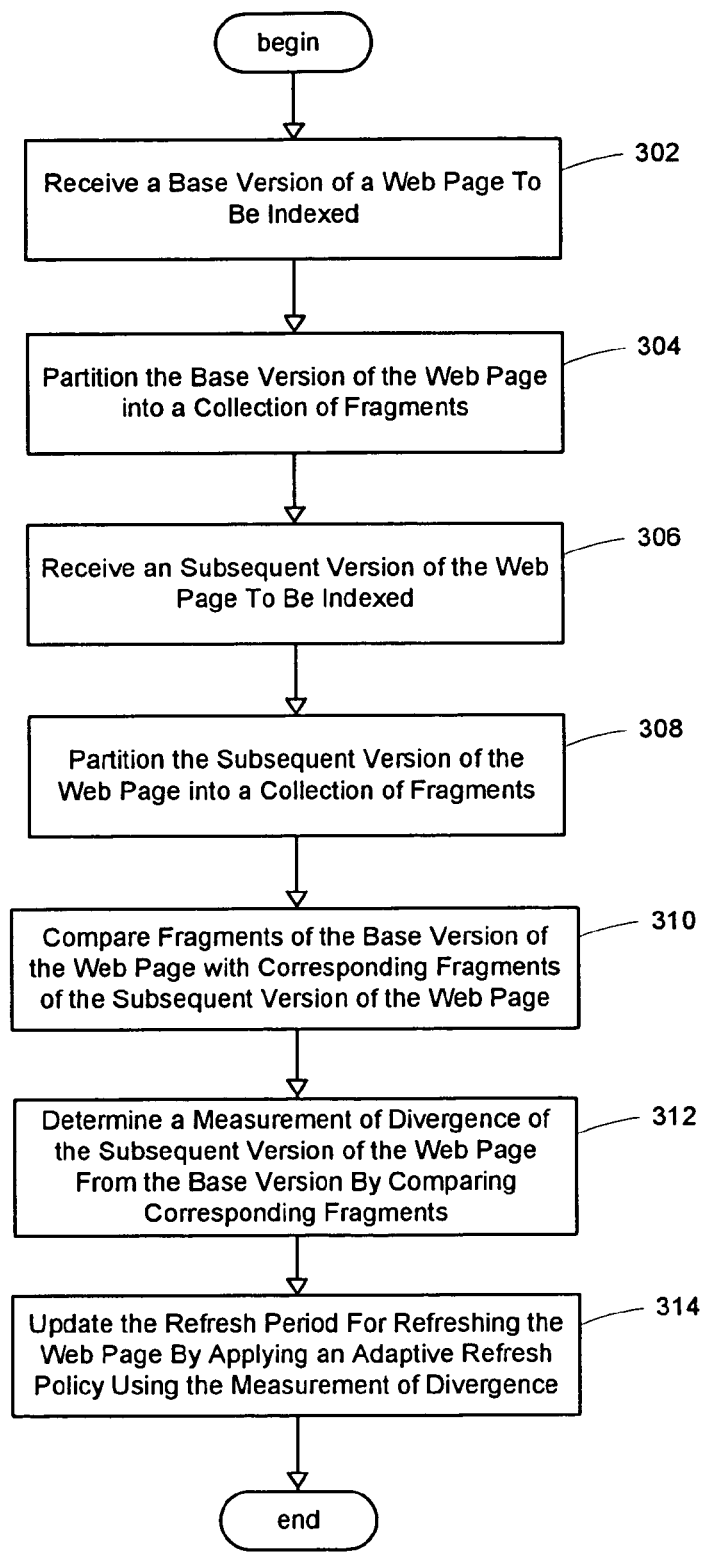
FIG. 3 is a flowchart generally representing the steps undertaken in one embodiment for adaptively refreshing a web page, in accordance with an aspect of the present invention.

FIG. 3 presents a flowchart generally representing the steps undertaken in one embodiment for adaptively refreshing a web page. A base version of a web page in a collection of web pages to be indexed may be received at step 302. The base version of the web page may be partitioned into a collection of fragments at step 304. In an embodiment for partitioning a web page into a collection of fragments, a web page may be represented as a DOM tree and fragments may be defined based on subtrees of a certain size. (See for example, World Wide Web Consortium, The Document Object Model.) This embodiment may require more computational overhead than other embodiments and might lead to odd results in the presence of updates that alter the upper levels of the tree. In various other embodiments, a web page may be treated as a sequence of words that may be partitioned into a collection of fragments.

In an embodiment of partitioning a sequence of words into a collection of fragments, the shingles method may be employed in which the set of fragments may be the set of word-level k-grams (including ones that overlap) for a fixed value of k. Hashing may be used to reduce the representation size of a fragment. To further reduce the space footprint, the M shingles of minimal hash value may be retained, for some constant M>0; an unbiased estimator of the Jaccard distance may also be applied based on minimal shingle sets. (See A. Z. Broder, S. C. Glassman, and M. S. Manasse, *Syntactic Clustering of the Web*, In Proceedings World Wide Web, 1997.) (See also U.S. Pat. No. 6,230,155, entitled "Method for Determining the Resemblance of Documents".) This embodiment of partitioning a sequence of words into a collection of fragments may advantageously be able to distinguish small changes from large ones.

A subsequent version of the web page may be received at step 306. The subsequent version of the web page may also be partitioned into a collection of fragments at step 308. Fragments from the base version of the web page may then be compared at step 310 with corresponding fragments from the subsequent version of the web page. The divergence between the web pages may be determined at step 312 from comparing the corresponding fragments. In an embodiment for instance, the divergence between the source and crawled versions of P may be represented by $D(P_S, P_C)$, where $$D(P_S, P_C) = 1 - \frac{|F(P_S) \cap F(P_C)|}{|F(P_S) \cup F(P_C)|}.$$

Using the determined measurement of divergence, the refresh period for scheduling refreshing the web page may then be updated at step 314 by applying an adaptive refresh policy. In an embodiment, the adaptive refresh policy may schedule refreshing a web page at time t where a function estimating the utility of refreshing the web page by examining the determined measurement of divergence may meet or exceed a utility threshold, T. Upon updating the refresh period for scheduling refreshing the web page, an indication of the divergence measurement of the difference between the base version of the web page and the subsequent version of the web page may be output and processing may be finished for adaptively refreshing a web page. In an embodiment, the indication of the divergence measurement may be output by persistently storing the indication of the divergence measurement in a change profile of a web page.

Change Profile of a Web Page

Figure 4:
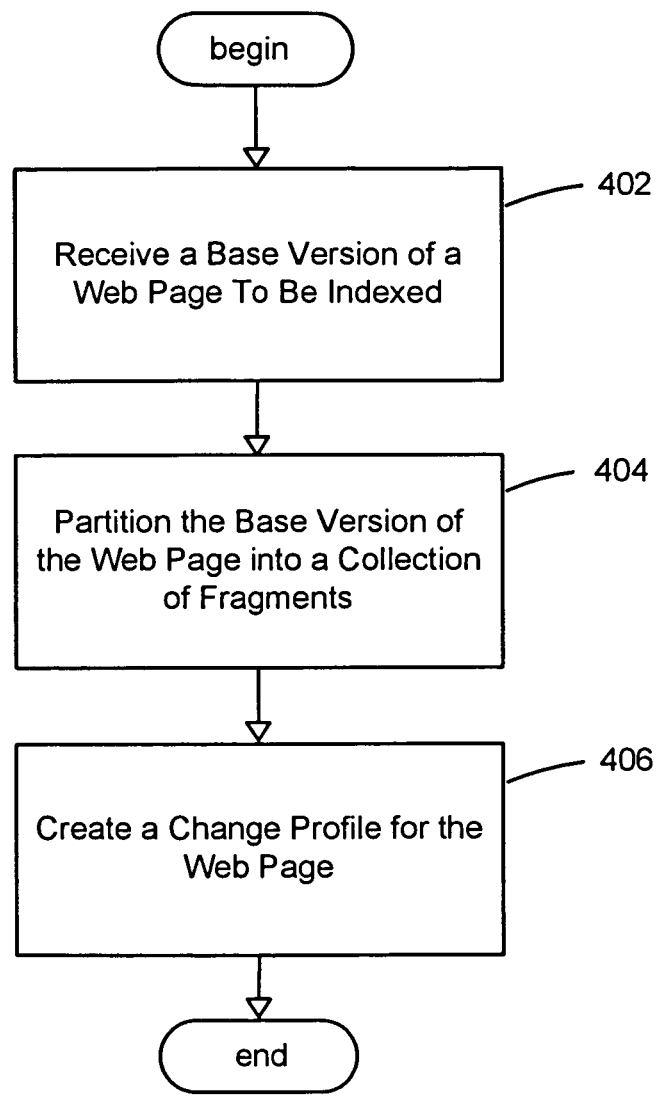
FIG. 4 is a flowchart generally representing the steps undertaken in one embodiment for creating a change profile of a web page, in accordance with an aspect of the present invention.

A web crawler may not typically have access to the full change history of a web page and may not be able to compute measures such as $U_P(\cdot)$ directly. However, an adaptive page refresh policy may be employed that simultaneously estimates and exploits the change behavior of a web page to achieve a good overall refresh schedule by constructing and adaptively maintaining a change profile of each web page. A change profile may include salient information to permit the crawler to differentiate between persistent and ephemeral information, in addition to the usual differentiation between fast-changing and slow-changing pages. FIG. 4 presents a flowchart generally representing the steps undertaken in one embodiment for creating a change profile of a web page. At step 402, a base version of a web page may be received. The base version of the web page may be partitioned into a collection of fragments at step 404. In various embodiments, the shingles method described in conjunction with step 304 of FIG. 3 may be employed to partition the sequence of words of a web page into a collection of fragments. A change profile may be created for the web page at step 406 that may include a shingle summary of the base version of the web page.

A change profile may include a sequence of pairs indicating a time and a divergence measurement, such as (time, divergence), starting with a pair representing a base measurement, $(t_B, 0)$, and followed by zero or more subsequent measurements in increasing order of time. Each measurement may correspond to a web page refresh event. Time $t_B$ may be defined as the base time at which the change profile was created. In an embodiment, subsequent divergence values may be relative to the base version, which may be the version of the web page as of time $t_B$, written $P(t_B)$. For example, a sequence of pairs representing a time and divergence measurement of a change profile may be: <(10, 0), (12, 0.2), (15, 0.2)>. This sequence of a change profile may indicate that the refresh times for this web page may include 10, 12, and 15, and that $D(P(10),P(12))=0.2$, and $D(P(10),P(15))=0.2$. In an embodiment, one change profile may be maintained for a web page, along with a shingle summary of the base version $P(t_B)$.

Figure 5:
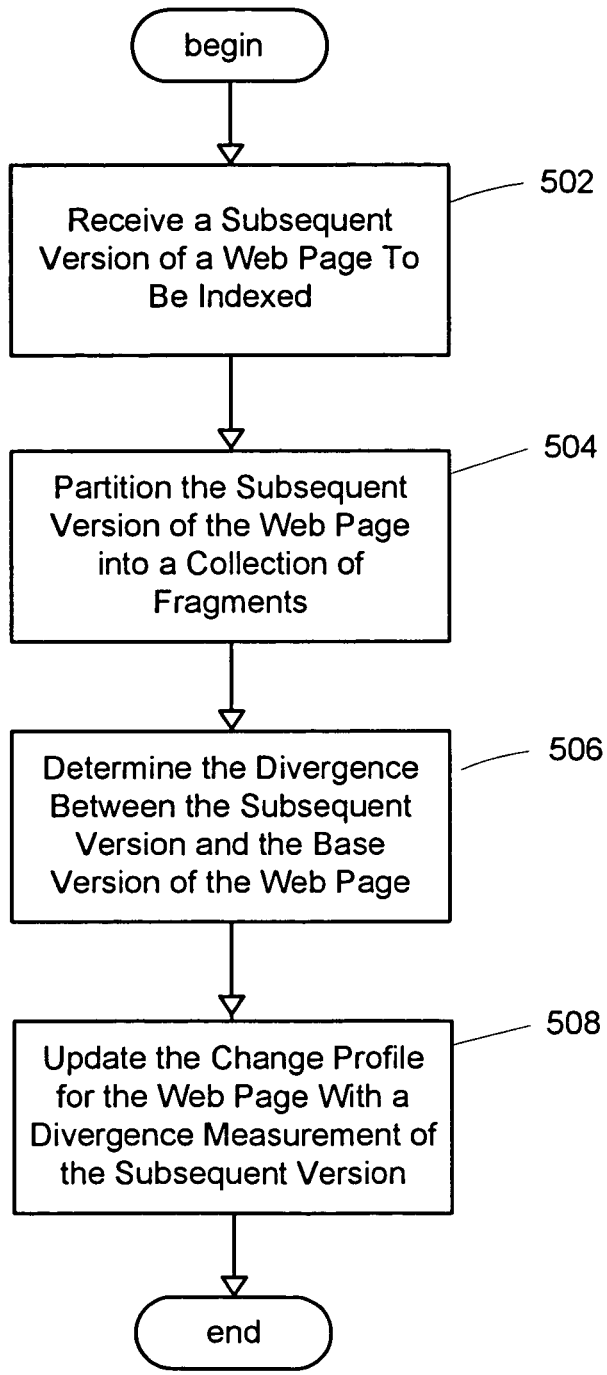
FIG. 5 is a flowchart generally representing the steps undertaken in one embodiment for updating a change profile of a web page, in accordance with an aspect of the present invention.

FIG. 5 presents a flowchart generally representing the steps undertaken in one embodiment for updating a change profile of a web page. In general, each time web page P may be refreshed, the change profile may be updated. At step 502, a subsequent version of a web page may be received after the change profile of the web page may have been created. The subsequent version of the web page may be partitioned into a collection of fragments at step 504. In various embodiments, the shingles method described in conjunction with step 304 of FIG. 3 may be employed to partition the sequence of words of a web page into a collection of fragments. The divergence of the subsequent version from the base version stored in the change profile may be determined at step 506. For example, if the subsequent version may be received at time 23, $D(P(10),P(23))$ may be determined in an embodiment by comparing the shingle summary of the base version, $P(10)$, with the shingle summary of $P(23)$.

After determining the divergence measurement of the subsequent version from the base version of the web page, the change profile may be updated for the web page at step 508 by including the divergence of the subsequent version of the web page in the change profile. For instance, at time t, the change profile may be extended by appending the pair $(t, D(P(t_B), P(t)))$ to the sequence of pairs of the change profile. Thus, if $D(P(10),P(23))=0.3$ at time 23, the sequence of pairs of the change profile, <(10, 0), (12, 0.2), (15, 0.2)> may be extended by appending $(23, 0.3)$ so that the updated sequence of pairs may be <(10, 0), (12, 0.2), (15, 0.2), (23, 0.3)>.

Adaptively Scheduling Refreshing a Web Page Using a Change Profile

Figure 6:
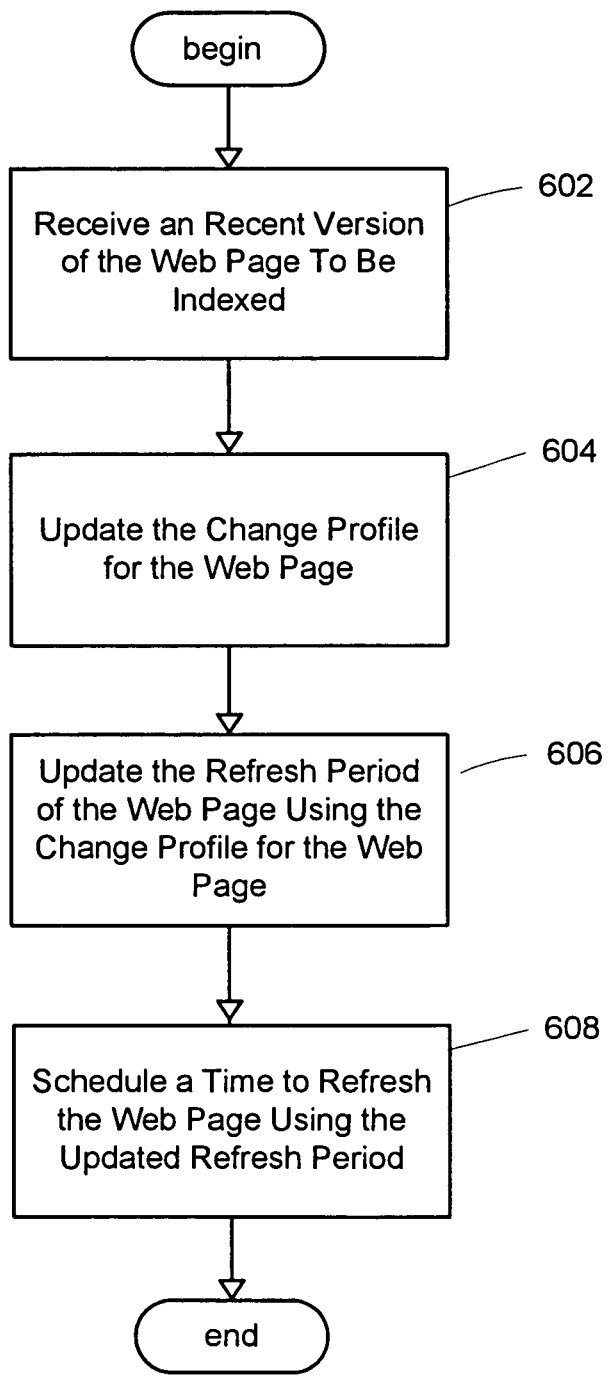
FIG. 6 is a flowchart generally representing the steps undertaken in one embodiment for adaptively scheduling refreshing a web page using a change profile, in accordance with an aspect of the present invention.

Refresh scheduling may be driven by change profiles and may occur on a strictly local basis with minimal cross-node communication among processing nodes executing refresh scheduling in a distributed system. Moreover, the scheduling method may be based on an underlying theoretical model of optimal refreshing. FIG. 6 presents a flowchart generally representing the steps undertaken in one embodiment for adaptively scheduling refreshing a web page using a change profile. At step 602, a recent version of a web page may be received after the change profile of the web page may have been created. The change profile may be updated for the web page at step 604 by employing the steps described in FIG. 5 including partitioning the recent version of the web page into a collection of fragments, determining the divergence measurement of the recent version from the base version of the web page, and updating the change profile for the web page by including the divergence of the recent version of the web page in the change profile. The refresh period for scheduling refreshing the web page may then be updated at step 606 using the change profile.

In general, a goal of an adaptive refresh policy may be to converge on an appropriate refresh period $\phi$ to use for a web page, based on estimating utility by examining the recent change history of a web page and comparing the estimated utility to a parameter T that may specify a utility threshold, i.e., an amount of utility for which it may be deemed worthwhile to perform a refresh. A partial sample of a web page's change history may be provided in the change profile. Consider $t_L$ to denote the most recent time in the sequence of pairs indicating a time and a divergence measurement included in a change profile. A lower bound, denoted as $A_{min}$ and an upper bound, denoted as $A_{max}$, may be computed on the area under a divergence curve in the interval $[t_B, t_L]$. Substituting these bounds into $U_P(t)=t \cdot f_P(t) - \int_0^t f_P(x)dx$, the following lower bound, $U_{min}$, and upper bound, $U_{max}$, on the utility U of using refresh period $(t_L - t_B)$ may be obtained:

$$U_{min}=(t_L-t_B) \cdot D(P(t_B),P(t_L))-A_{max},$$

$$U_{max}=(t_L-t_B) \cdot D(P(t_B),P(t_L))-A_{min}.$$

Immediately after refreshing a web page and extending the sequence of pairs of its change profile, the following refresh policy may be applied in an embodiment to adaptively adjust the refresh period $\phi$:

if $U_{max} < T$, set $\phi := (t_L - t_B) \cdot 2$.

if $U_{min} \geq T$, reset the change profile to $\{(t_L, 0)\}$, set the base version to $P(t_L)$, and set $\phi := \phi/2$.

After updating the refresh period for scheduling refreshing the web page, a time may be scheduled at step 608 for refreshing the web page using the updated refresh period. In an embodiment, the next refresh of the web page may be scheduled for $\phi$ time units in the future.

The above policy may be guided by the rationale that if the upper bound on utility may be below the utility threshold T, the period $(t_L - t_B)$ may be too short, so exploration of larger refresh periods may continue. To do so, the quantity $(t_L - t_B)$ may be doubled in an embodiment. On the other hand, if the lower bound on utility may be above the utility threshold T, the period $(t_L - t_B)$ may be too long, so exploration of shorter refresh periods may be initiated by starting over using half of the current period in an embodiment. There may arise a third case in which the utility bounds may straddle the utility threshold, i.e., $U_{min} < T \leq U_{max}$. In this case, the refresh period may be left unchanged in various embodiments.

Given that Web sources may be autonomous and web pages may change arbitrarily at any time, it may be important to mitigate the risk associated with waiting a long time between refreshes. A policy may aim to refresh a web page whenever a utility penalty of not doing so may exceed T and may also aim to guarantee that, in the worst case, the utility penalty incurred without performing a refresh may be at most $\rho \cdot T$, where $\rho \geq 1$ may be a risk control parameter. Recalling that $D_{max}$ may denote the maximum divergence value allowed under a chosen freshness model, the maximum loss in utility incurred during t time units may be denoted as $t \cdot D_{max}$. To cap the utility loss between refreshes at $\rho \cdot T$, the refresh period $\phi$ may be restricted in an embodiment to remain less than or equal to $\rho \cdot T/D_{max}$.

Figure 7:
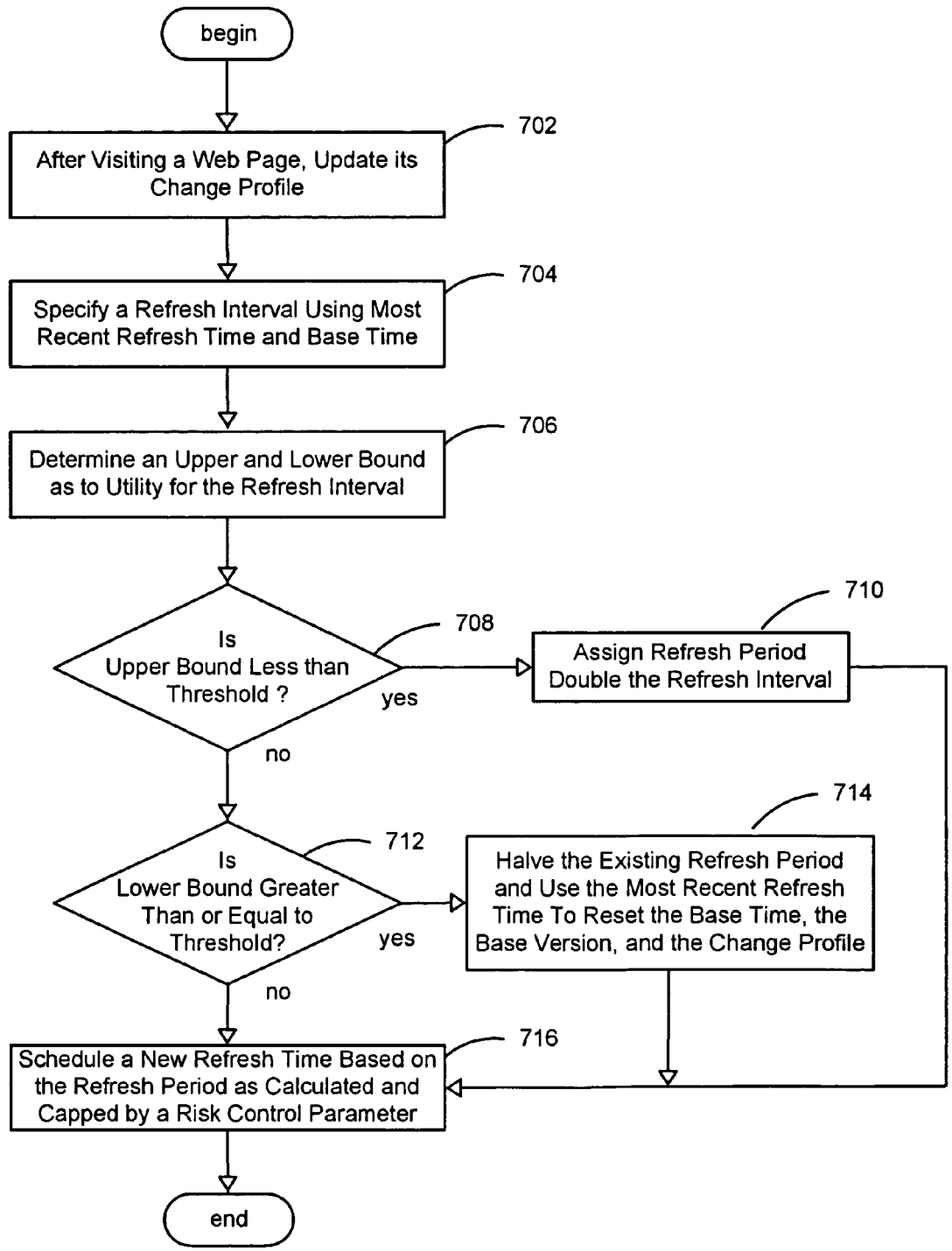
FIG. 7 is a flowchart of a process for using a refresh policy for incremental updating web pages by calculating a refresh time for revisiting a web page and checking for changes to it, in accordance with an aspect of the present invention.

Some embodiments of the present invention enable downloading new pages and keeping previously-downloaded pages fresh by providing a page-refresh policy that might be used by an automated incremental updater such as a web crawler. In this regard, FIG. 7 shows a flowchart of a process for calculating a refresh time for revisiting a web page and checking for changes to it, which process might be used as a policy in some embodiments. In the first step 702 of the process, the policy causes an incremental updater, such as a web crawler, to visit a web page and then updates the change profile for the web page. In the second step 704, the policy specifies a refresh interval based on the base time in the change profile and the most recent refresh time added to the profile, namely, the time added in step 702. In some embodiments, this refresh interval is defined as $(t_L - t_B)$, where $t_L$ is the most recent time in the change profile and $t_B$ is the base time, i.e., the time at which the change profile was initiated. Then, in the third step 706, the policy determines upper and lower bounds with respect to utility for the refresh interval just specified. For example, the policy may determine the lower bound, $U_{min}$, and upper bound, $U_{max}$, on the utility U of using refresh period $(t_L - t_B)$ defined by:

$$U_{min} = (t_L - t_B) \cdot D(P(t_B), P(t_L)) - A_{max}, \quad U_{max} = (t_L - t_B) \cdot D(P(t_B), P(t_L)) - A_{min}.$$

In step 708, the policy determines whether the upper bound from step 706 is less than a utility threshold, T. If so, the policy proceeds to step 710, where the refresh period is set to double the refresh interval before proceeding to step 716. Otherwise, if the upper bound is not less than the utility threshold, the policy proceeds directly from step 708 to step 712. In step 712, the policy determines whether the lower bound from step 706 is greater than or equal to the utility threshold. If so, the policy proceeds to step 714, where the refresh period is halved before proceeding to step 716. Also at step 714, the policy resets the base time to $t_L$, the base version of the web page to $P(t_L)$, and the change profile to $\{(t_L, 0)\}$. Otherwise, if the lower bound is less than the utility threshold, the policy proceeds directly from step 712 to step 716. In step 716, the policy schedules a new refresh time for the web page, using the refresh period as calculated and as capped by a risk control parameter. In this regard, note that if the threshold is greater than the lower bound or is less than or equal to the upper bound, the refresh period remains unchanged.

In addition to adaptively adjusting the refresh period by examining the change history of the web page and by comparing the utility of refreshing the web page at the expiration of the refresh period to a utility threshold, the framework of the described invention will also support other refresh policies. Those skilled in the art will appreciate that a uniform refresh policy may be applied that may set the refresh period at a fixed time interval such as 48 hours, a greedy refresh policy may be applied to adaptively adjust the refresh period by halving the refresh period if the divergence measurement may exceeds a threshold or otherwise doubling the refresh period, a cost refresh policy may be applied to adaptively adjust the refresh period by comparing the cost of refreshing a web page to a lower bound, and so forth.

As can be seen from the foregoing detailed description, the present invention provides an improved system and method for adaptively refreshing a web page. A base version of a web page may be partitioned into a collection of fragments that may be compared with the corresponding fragments of a recent version of the web page to determine a divergence measurement of the difference between the base version and the recent version of the web page. The divergence measurement may be recorded in a change profile representing a change history of the web page that includes a sequence of numeric pairs indicating a time offset and a divergence measurement of the difference between a version of the web page at the time offset and a base version of the web page. The refresh period for the web page may be adjusted by applying an adaptive refresh policy using the divergence measurements of the change profile of the web page. Advantageously, the web page refresh model presented may be flexibly parameterized by a choice of divergence function to quantify the degree of difference between fresh and outdated versions of a web page. The web page refresh policy using the change profile may be selective, adaptive and local. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for adaptively refreshing a web page, comprising:
   a web crawler refreshing the web page;
   a processor device operating as a page refresh policy manager implementing a page refresh policy to determine a refresh period for the web page using a divergence measurement between a base version and one or more subsequent versions of the web page, by performing:
   receiving a base version of the web page to be indexed;
   partitioning the base version of the web page into a first collection of fragments;
   receiving a subsequent version of the web page; and
   partitioning the subsequent version of the web page into a second collection of fragments;
   a processor device operating as a fragment comparator performing:
      comparing the fragments from the first collection to corresponding fragments from the second collection to determine the divergence measurement representing a numeric degree of difference between the fragments from the first and second collections;
      recording the divergence measurement in a change profile for the web page;
      using the divergence measurement between the fragments as the web page divergence between web page versions;
      updating a refresh period for scheduling refreshing the web page using the determined divergence measurement; and
   scheduling a time for refreshing the web page using the refresh period;
   wherein updating the refresh period of the web page using the web page divergence for scheduling refreshing of the web page comprises applying an adaptive refresh policy to adjust the refresh period by determining a lower bound on utility and an upper bound on utility of refreshing the web page at expiration of the refresh period by examining the change history of the web page and increasing the refresh period if the upper bound of utility is less than the utility threshold or decreasing the refresh period if the lower bound of utility is greater than or equal to the utility threshold;

wherein the utility threshold is less than a risk control parameter.

2. The system of claim 1 further comprising a page refresh scheduler for scheduling refreshing the web page at a time indicated by the refresh period.

3. The system of claim 1 further comprising a change profile manager for updating the change profile of the web page, the change profile measuring changes between the base version of the web page and the one or more subsequent versions of the web page.

4. A computer-implemented method for adaptively refreshing a web page, comprising:
using a processor device configured to perform:
receiving a base version of the web page;
partitioning the base version of the web page into a first collection of fragments;
receiving a first subsequent version of the web page;
receiving a second subsequent version of the web page;
partitioning the second subsequent version of the web page into a second collection of fragments;
comparing the fragments from the first collection to corresponding fragments from the second collection to determine a divergence measurement representing a numeric degree of difference between the fragments from the first and second collections;
recording the divergence measurement in a change profile for the web page;
using the divergence measurement between the fragments as a web page divergence between a base version of the web page and the subsequent version of the web page;
outputting an indication of the web page divergence, wherein the web page divergence is determined at least in part on a comparison of a content of the base version to a content of the one or more subsequent versions of the web page;
updating a refresh period of the web page using the web page divergence for scheduling refreshing of the web page; and
scheduling a time for refreshing the web page using the refresh period;
wherein updating the refresh period of the web page using the web page divergence for scheduling refreshing of the web page comprises applying an adaptive refresh policy to adjust the refresh period by determining a lower bound on utility and an upper bound on utility of refreshing the web page at expiration of the refresh period by examining the change history of the web page and increasing the refresh period if the upper bound of utility is less than the utility threshold or decreasing the refresh period if the lower bound of utility is greater than or equal to the utility threshold;

wherein the utility threshold is less than a risk control parameter.

5. The method of claim 4 wherein outputting the indication of the web page divergence comprises updating the change profile for the web page by including the indication of the web page divergence in the change profile.

6. A non-transitory computer-readable storage medium having computer-executable instructions, the computer-executable instructions when executed by a processor perform the following operations comprising:
receiving a base version of the web page;
partitioning the base version of the web page into a first collection of fragments;
receiving a first subsequent version of the web page;
receiving a second subsequent version of the web page;
partitioning the second subsequent version of the web page into a second collection of fragments;
comparing the fragments from the first collection to corresponding fragments from the second collection to determine a divergence measurement representing a numeric degree of difference between the fragments from the first and second collections;
recording the divergence measurement in a change profile for the web page;
using the divergence measurement between the fragments as a web page divergence between a base version of the web page and the subsequent version of the web page;
outputting an indication of the web page divergence, wherein the web page divergence is determined at least in part on a comparison of a content of the base version to a content of the one or more subsequent versions of the web page;
updating a refresh period of the web page using the web page divergence for scheduling refreshing of the web page; and
scheduling a time for refreshing the web page using the refresh period;
wherein updating the refresh period of the web page using the web page divergence for scheduling refreshing of the web page comprises applying an adaptive refresh policy to adjust the refresh period by determining a lower bound on utility and an upper bound on utility of refreshing the web page at expiration of the refresh period by examining the change history of the web page and increasing the refresh period if the upper bound of utility is less than the utility threshold or decreasing the refresh period if the lower bound of utility is greater than or equal to the utility threshold;

wherein the utility threshold is less than a risk control parameter.

7. The non-transitory computer-readable storage medium of claim 6, wherein outputting the indication of the web page divergence comprises updating the change profile for the web page by including the indication of the web page divergence in the change profile.

* * * * *